Nov. 23, 1943. C. J. THOMPSON 2,334,799
OUTLET MOUNTING
Filed Feb. 6, 1940 2 Sheets-Sheet 1
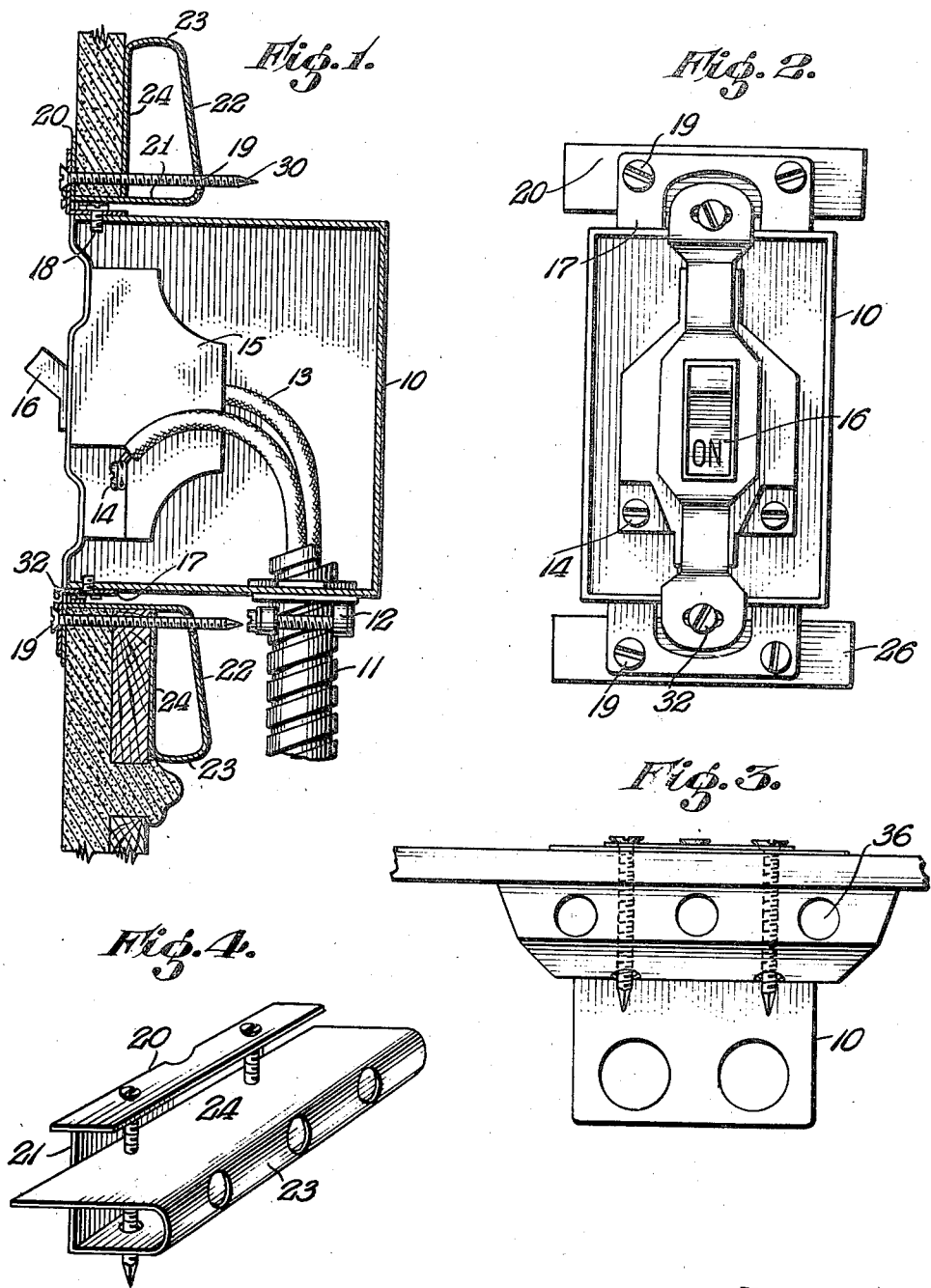
Inventor:
Clifford J. Thompson,
by Henry H. Snelling
Attorney.

Nov. 23, 1943.          C. J. THOMPSON          2,334,799
                         OUTLET MOUNTING
                        Filed Feb. 6, 1940          2 Sheets-Sheet 2

INVENTOR.
Clifford J. Thompson
BY Henry H. Snelling
ATTORNEY.

Patented Nov. 23, 1943

2,334,799

UNITED STATES PATENT OFFICE 2,334,799

OUTLET MOUNTING

Clifford J. Thompson, Washington, D. C.

Application February 6, 1940, Serial No. 317,615

10 Claims. (Cl. 220—3.6)

This invention relates to outlet mountings and has for its principal object the provision of a simple and efficient clasp for mounting and holding electric outlet boxes of any types, being particularly advantageous when the box is to be installed in a finished wall or ceiling.

A further object of the invention is to provide a firm clamp which is easy to install in the usual styles of walls and ceilings, such as lath and plaster, plaster board, ply wood, metal laths, etc., and which will hold a switch box without jarring or vibration, thus avoiding the common fault of outlet fixtures, that is, loosening of the plaster by reason of the resilience of the box itself when the switch is moved.

At the present time the most usual method of installing an outlet box is to screw the box directly to the laths but this is unsatisfactory because the laths are yielding and the box soon becomes loosened causing the plaster to fall away around the hole, making the outlet unsightly even though a fairly large cover plate is used. Sometimes an excellent job is provided by removing parts of the wall and nailing strips to the studding. While this method insures a neat job it consumes a great deal of time and often involves repapering and replastering. The mounting of the present invention eliminates this loss of time and the extra expense and in addition permits the installation of an outlet box in a plaster board wall which is not possible with either of the older methods.

Briefly, my mounting consists of a pair of flexible clamps which are secured to the wall by a vise-like grip so that the outlet box and its bracket and the mounting are secured together in a rigidly held assembly. Perforations through the metal of the clamp or other means for weakening the clamp blank transversely permit the two ends of the blank of the mounting being held parallel to one another for convenient reception of screws or other means which bind the mounting to the wall by drawing the wall engaging ends together.

In the drawings:

Figure 1 is a vertical section showing the clamp and the outlet box in place in a wall opening.

Figure 2 is a front elevation.

Figure 3 is a top plan view.

Figure 4 is a perspective of a clamp with its screws.

Figure 5:
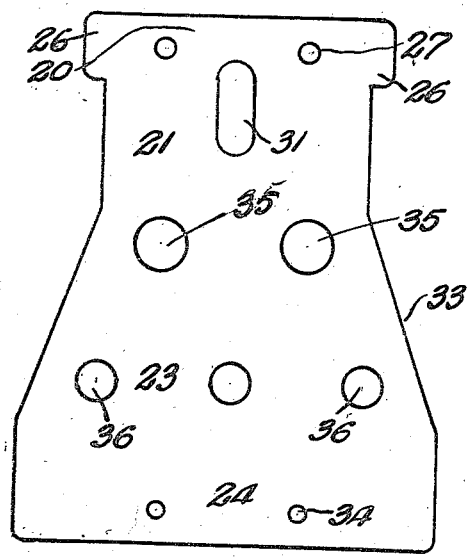
Figure 5 is a plan of the blank before bending.
Figure 6:
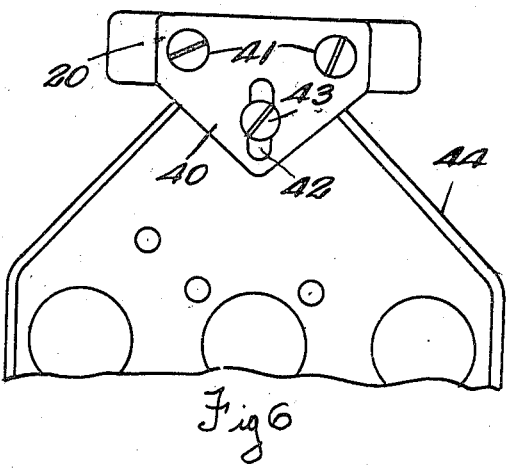
Figure 6 is a bottom plan view of my mounting when used with a round or octagon box installed in a ceiling.

In Figure 1 the outlet box 10 is secured to the armored cable 11 as by the usual cable clamp 12 and the wires 13 are secured as at 14 to the fixture, here shown as a switch box having a porcelain body 15 and a switch handle 16. The box is secured to its brackets 17 as by the screws 18 extending vertically and the horizontal screws 19 which secure the brackets to the mountings. The metal screws in the methods previously described are replaced by wood screws 19 which extend into the laths.

The clamp forming the principal portion of the mounting includes a front plate 20, a facing plate 21, which forms a reinforcing casing for the top and bottom ends of the hole in the wall, a rear sloping portion 22, a curved portion 23 and a backing portion 24, all of these portions being integral in the preferred construction which is made from a sheet metal blank which affords maximum surface engagement with the wall and the opening and may be of reasonably heavy gauge rust-proof material.

The blank itself is shown in Figure 5 from which it will be seen that the front portion 20 is provided with two lateral ears 26 which extend on both sides of the opening. This front portion is provided with a pair of holes 27 to receive the holding screws 19 fairly snugly. An elongated perforation 31 extends partly through the front end portion 20 and partly through the facing portion 21, its purpose being to provide clearance for the usual screw 32 which holds the cover plate of the box in place and covers the holding means as well as the box.

The rear portion 22, as will be noted, slopes sharply at both sides as at 33, thus making the backing portion 24 the widest part of the blank. The holes 34 in the backing portion are tapped for threaded engagement with the screws 19 which extend very loosely through the holes 35 just beyond the facing portion of the blank. Between these lines of holes are the holes 36 the purpose of which is to weaken the blank so as to vary the angle between the backing portion 24 and the rear portion 22 in order to permit the end sections 20 and 24 to remain parallel even though the walls should vary appreciably in thickness as is illustrated in Figure 1.

In the installing of an outlet fixture with my mountings the hole in the wall is cut in the usual manner except that it is possible to make the hole a little more snug from side to side. Care should be taken to keep the hole as square as possible in order to secure all of the advantages resulting from the use of my mounting, for example, the facing portion 21 of the clamp covers or faces the entire top or bottom end of the hole and if these are cut squarely the contact will be better. The armored cable 11 is drawn through the wall in the usual way and is secured to the box as at 12. The two clamps are now inserted in the ends of the hole and bent to the proper angle. The brackets 17 at each end of the electrical outlet box are reversed from their usual position and when the box is returned to place the holes in the brackets are alined with the two holes in the clamps. The long screws 19 which are preferably of high quality steel cadmium plated have auger points 30 to drill easily and quickly through the material of the wall. These, when inserted in the holes 27 are kept square to the work, that is, parallel to the top and bottom of the walls of the box so they will enter the threaded holes 34 in the backing portion or plate and thus draw the front plate and the backing plate together as the screws are tightened and this is true even though the depth of the wall may vary within a considerable range, as the rounded portion 23 having therein the three holes 36 yields readily to give the desired parallel surfaces. The pointed end 30 of the screw extends easily and readily through the large holes 35 which are made of sufficient diameter to take care of any variances.

In cases where the box is either round, octagonal, or otherwise not suited to direct application, a small clip 40 is provided having therein two slots 41 the same distance apart as the bracket screws 19 and having an additional slot 42 to receive a screw 43 to secure the box 44 to the clip which in turn is secured to the front portion 20 of the clamp. The clip 40 thus takes the place of the bracket 17.

Figure 7:
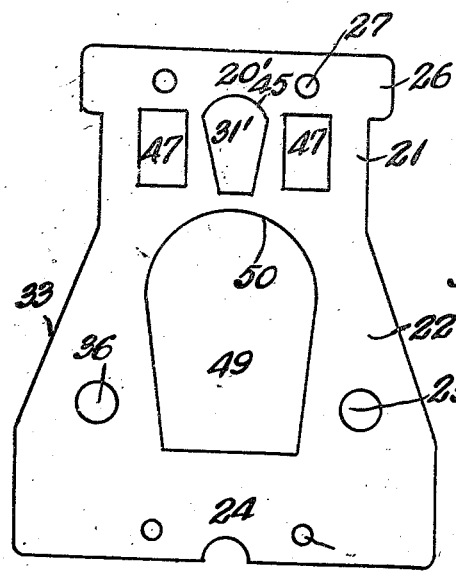
Figure 7 is a view of a modified blank.
Figure 8:
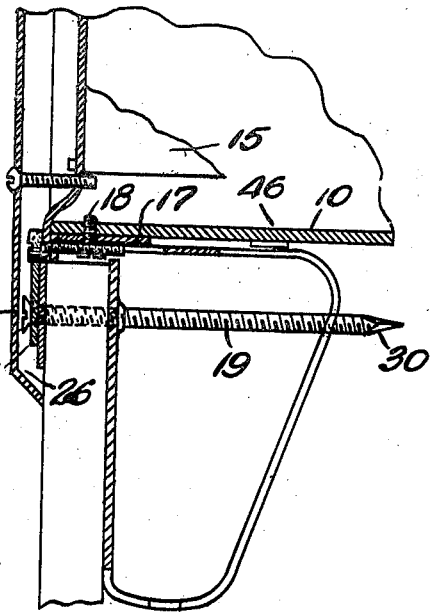
Figure 8 is a section thru the blank of Fig. 7.

In the modified form shown in Figures 7 and 8 the clip has the same outside margins but the hole 31 is replaced by a larger opening 31' surrounding the central screw 32 which extends through a lug from the box and also thru the holding means or bridge to which the porcelain body 15 is secured. By adding the arc 45 clearance is allowed for the lug of the box and this permits the clip to touch the box lip 46 and also the bracket 17. The holes 47 are for clearance of the screws 18 which secure the box to its brackets 17. In place of the holes 35 and the central hole 36 the opening 49 is provided having a curved edge 50 to allow a clearance for conduit or a Bx connector when a shallow box is used as is sometimes convenient.

What I claim is:

1. A clamp for holding an outlet box in a wall, comprising an integral member having a front portion to engage one side of a wall, a backing portion to engage the other side of said wall, a facing portion to engage and protect one face of the opening in said wall, and a fourth portion joining the facing portion and one of the wall engaging portions, forming acute angles therewith, two of said portions having openings therethrough to receive holding means.

2. A clamp for holding an outlet box in a wall opening comprising an integral member having two parallel wall-engaging end portions and an intermediate portion of two legs forming an acute angle, said intermediate portion forming an acute angle with one of said end portions, each of said portions having a hole therethrough to receive a screw to draw the parallel portions together, one of said holes being threaded to engage the screw.

3. A clamp to secure a switch box in a wall opening, comprising an integral member having its ends parallel to engage opposite sides of the wall, and a V-shaped portion joining said ends, one side of the V joining the outside end at substantially a right angle to engage snugly the wall opening and the other leg joining the inside end at an acute angle having a rounded vertex, said other leg and both of said ends of the integral member each having a hole therethrough to receive a headed screw to draw the parallel portions together, one of said holes being threaded to engage the screw.

4. A mounting for holding an outlet box in a wall opening, comprising two parallel wall engaging portions, resilient means joining said portions so as to hold the portions parallel although clamping walls of different thicknesses, and fastening means for drawing the parallel portions together.

5. The device of claim 4 in which the resilient means includes a facing portion forming a casing for one end of the wall opening and the fastening means is a screw passing through the wall itself and therefore entirely surrounded by the wall when the outlet box is clamped in place, thus avoiding injury to the face of the opening.

6. A clamp including a facing portion to engage a wall opening, an outer wall engaging portion having side extensions projecting beyond the sides of the facing portion, an inner wall engaging portion, and a trapezoidal intermediate portion integral with the facing and inner wall engaging portions.

7. A mounting for holding an outlet box in a wall opening, comprising two wall engaging portions, resilient means joining said portions so as to hold the portions parallel although clamping walls of different thicknesses, and fastening means for drawing the parallel portions together, said resilient means including a curved portion having perforations therein to weaken it along the line of bending to make the wall engaging portions parallel.

8. A mounting for holding an outlet box in a wall opening, comprising two wall engaging portions, resilient means joining said portions so as to hold the portions parallel although clamping walls of different thicknesses, and fastening means for drawing the parallel portions together, said resilient means including a facing portion forming a casing for one end of the wall opening, and a curved portion having perforations therein to weaken it along the line of bending to make the wall engaging portions parallel.

9. A mounting for holding an outlet box in a wall opening, comprising two wall engaging portions, resilient means joining said portions so as to hold the portions parallel although clamping walls of different thicknesses, and fastening means for drawing the parallel portions together, said resilient means including a slotted facing portion forming a casing for one end of the wall opening and the slot therein serving to receive a cover plate screw.

10. A clamp serving as one of a pair of mountings to hold an outlet box in a generally rectangular opening cut in a wall to receive such an outlet box, comprising a member having a front portion to engage the front face of the wall, adjacent said opening, a backing portion spaced from the front portion so that it may engage the rear side of the wall, a facing portion generally normal to the front portion so that when the member is inserted in the wall opening and then moved laterally such facing portion may then cover and protect one of the two rough sides of the wall opening, and a fourth portion joining the facing portion and the backing portion, forming acute angles therewith, two of said portions having openings therethrough, whereby a holding means may be passed through both openings and when tightened will draw together the front portion and the back portion to clamp the wall between them.

CLIFFORD J. THOMPSON.